(12) United States Patent
Barrus

(10) Patent No.: US 7,287,698 B2
(45) Date of Patent: Oct. 30, 2007

(54) AUTOMATIC CLEANUP OF MACHINE READABLE CODES DURING IMAGE PROCESSING

(75) Inventor: John W. Barrus, Menlo Park, CA (US)

(73) Assignee: Ricoh Co., Ltd., Tokyo (JP)

( * ) Notice: Subject to any disclaimer, the term of this patent is extended or adjusted under 35 U.S.C. 154(b) by 345 days.

(21) Appl. No.: 10/629,245

(22) Filed: Jul. 28, 2003

(65) Prior Publication Data

US 2005/0023355 A1    Feb. 3, 2005

(51) Int. Cl.
*G06F 17/00* (2006.01)
*G06F 19/00* (2006.01)
*G06K 7/10* (2006.01)

(52) U.S. Cl. ............................. 235/462.15; 235/462.01
(58) Field of Classification Search ........... 235/462.15, 235/462.01; 283/93
See application file for complete search history.

(56) References Cited

U.S. PATENT DOCUMENTS

| | | | | |
|---|---|---|---|---|
| 5,227,617 A | * | 7/1993 | Christopher et al. ... | 235/462.13 |
| 5,296,896 A | * | 3/1994 | Nishiyama et al. ........... | 399/46 |
| 5,431,288 A | * | 7/1995 | Nishijima et al. .......... | 209/584 |
| 5,801,844 A | | 9/1998 | Yamakawa et al. | |
| 6,832,726 B2 | * | 12/2004 | Torchalski ............. | 235/462.25 |
| 2004/0108381 A1 | * | 6/2004 | Elliott et al. ........... | 235/462.01 |

* cited by examiner

*Primary Examiner*—Lisa Caputo

(57) ABSTRACT

A method and apparatus for automatically scanning and/or rewriting a machine readable code (MRC) of a document are described herein. In one embodiment, the method includes capturing an original machine-readable code (MRC) at a location of a document and generating a new MRC based on the original MRC. The new MRC represents the same data as the original MRC. The method also includes replacing the original MRC with the new MRC in the electronic version of the document at substantially the same location as the original MRC in the document. The electronic version of the document may then be stored and/or printed.

28 Claims, 9 Drawing Sheets

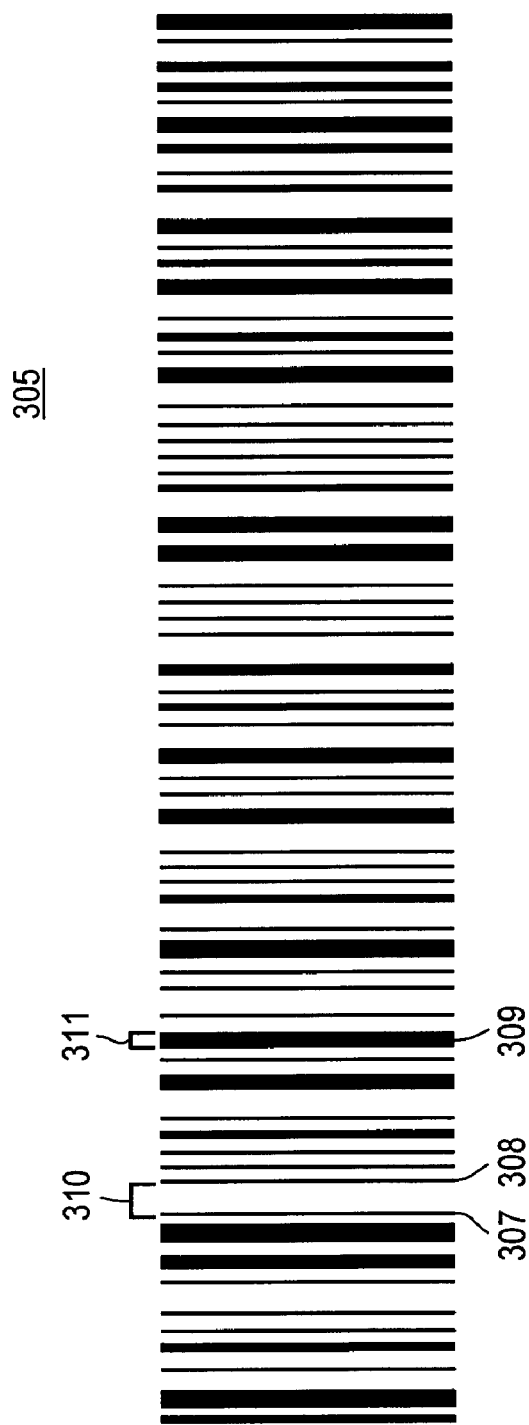

AUTOMATIC CLEANUP OF MACHINE READABLE CODES DURING IMAGE PROCESSING

FIELD OF THE INVENTION

The present invention relates generally to the field of machine readable codes. More particularly, this invention relates to scanning and reprinting machine readable codes on a document to replace the original codes.

BACKGROUND OF THE INVENTION

Barcodes have been used for many years in commercial settings. Barcodes are printed on many different types of media and represent information in encoded form. Once printed, these barcodes may be scanned using a barcode scanner, which reads the barcode to decode the information encoded therein. The prior art includes many examples of printing machines capable of printing barcodes and many instances of barcode scanners.

Often, a document having one or more barcodes may be copied or transferred among different people and places. During the copying and transferring, the condition of the barcodes may degrade over a period of time and eventually become unreadable by a barcode reader.

Typical wear and tear includes marks on the light areas of the code or scratches, which remove dark areas from the code. Stray pen marks or grime can change the appearance of the code as well as flaking of toner or paint. Distortion of a printed code occurs when the printout is crumpled or folded.

Copying can degrade a barcode. For instance, as the code is copied, the contrast of the new copy can be lower than that of the original. A barcode transmitted through a fax machine may not lose contrast, but if the lines of the code are not aligned precisely with the movement of the paper through the scanner, aliasing will be introduced along the edges of the code, creating a stair-step pattern where a smooth line existed before.

Most 1 dimensional or 2 dimensional barcodes are based on dark and light bars of a given width or that are multiples of a given width. For instance, the UPC code used in retail establishments is created from a series of bars and spaces, which are 1, 2, 3, or 4 units wide. The width of a 1 unit wide line is sometimes referred to as the "x-width" of the code.

If the "x-width" of the code is near but not exactly the size of a printing pixel unit width, the boundaries of the code lines will fall between printed pixels. Instead of a transition where one pixel is black and the next pixel white, a gray pixel will be printed between the black and white pixels. The transitions between dark and light areas will be weak. Barcodes are usually read by measuring the distance between transitions of dark and light areas, and weak transitions reduce the readability of the code.

Additionally, most printers have some amount of "bleed" corresponding to the printing process. For instance, when an inkjet printer prints a line of ink on a page, the ink bleeds into the page and a line printed at a certain thickness (t) will eventually spread out to be some thickness slightly greater than the printed thickness (t+delta t). If the spread (delta t) is near ½ of the x-width, the printed code will be difficult if not impossible to read after it is printed and the ink has spread.

SUMMARY OF THE INVENTION

A method and apparatus for automatically scanning and/or cleanup of a machine readable code (MRC) of a document are described herein. In one embodiment, the method includes capturing an original machine-readable code (MRC) at a location of a document, generating a new MRC based on the original MRC, where the new MRC represents the same data of the original MRC. The exemplary method also includes replacing the original MRC with the new MRC. The new MRC is located at substantially the same location as the original MRC with respect to the contents of the document. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIGS. 3A-3C are diagrams illustrating an exemplary process for processing machine readable codes.

DETAILED DESCRIPTION

Figure 1:
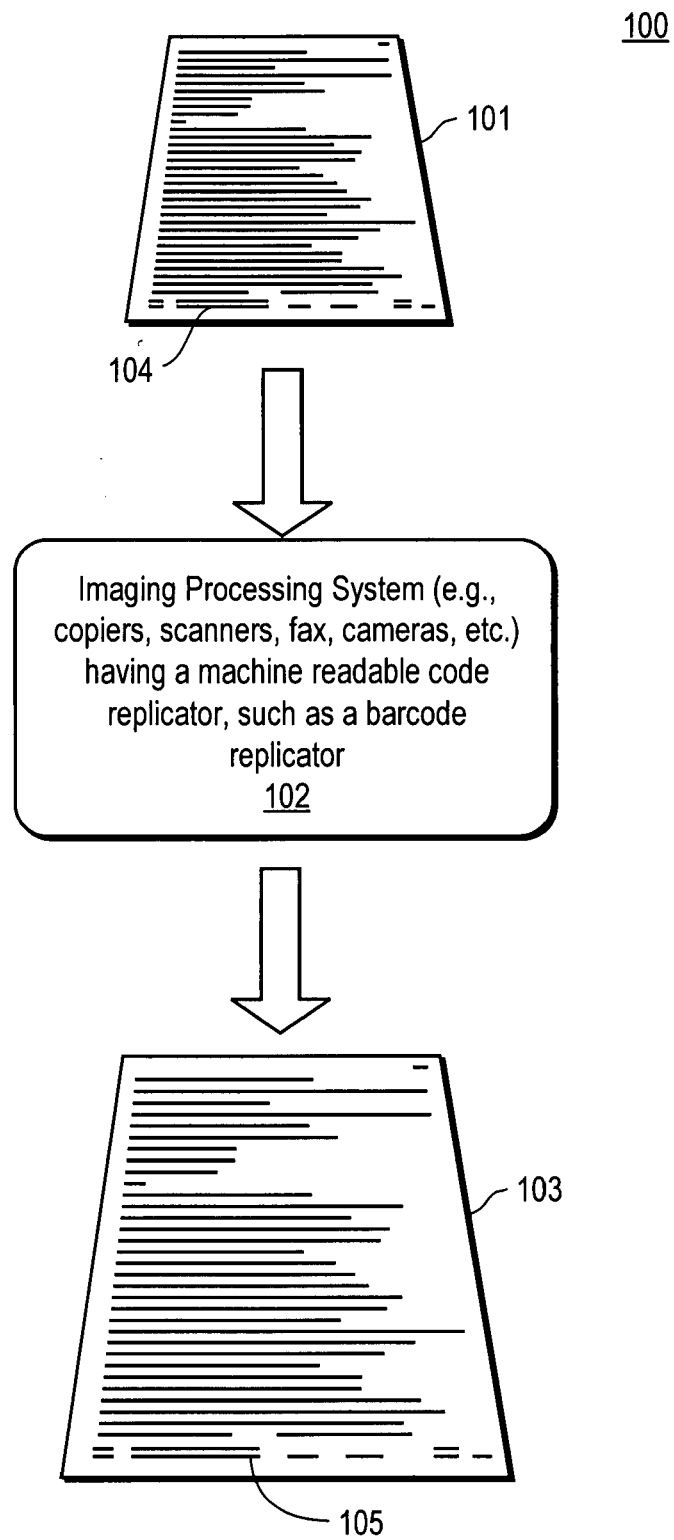
FIG. 1 is a block diagram of an exemplary embodiment of an image processing system having a machine readable code replicator.

An image processing device for processing machine readable codes (MRCs) is described. In one embodiment, a scanner, which may be embedded as part of an image processing device, such as a copier, a fax machine, a scanner, or a camera, etc., is able to locate and decode an MRC, such as barcode. In one embodiment, the scanner replaces only the sub-image containing the MRC within a document image (typically a rectangle) with a new, clean image of the MRC. The document image with the new MRC may then be stored and/or printed. When the document image is printed, the new MRC will be easier to read than the original one. As a result, the MRC, which passes through the image processing devices having these techniques, will not degrade over a time period. Note that for purposes herein the term document may include one or more pages.

In one embodiment, after an exemplary image processing device receives a document having one or more MRCs, such as barcodes, the image processing device searches and locates each MRC on the received document. Once an MRC is located, the image processing device scans and decodes the MRC and optionally stores the scanned MRC in the memory for future references. The image processing device then generates a new MRC based on the original MRC, where the new MRC represents the data of the original MRC. The image processing device may integrate the new MRC into a document image representing the document. The new document image may then be stored. The image processing device may print, as a part of printing the document on a media, the new MRC at substantially the same location as the original MRC on the document. The new MRC has a higher printing quality (e.g., edge sharpness and contrast) than the original MRC with respect to the background of the document.

The image processing device may be implemented as a copier, a scanner, a fax machine, a camera, etc. Furthermore, the image processing device may be implemented as a peripheral device having a server capable of connecting the device to a network (e.g., Internet) to perform at least one of the above operations in response to a request received from a remote client over the network. For example, the image processing peripheral may be a printer server coupled to a network.

Improving MRC Quality

There are many ways to improve an MRC in a digital image. Standards for printing machine-readable codes include at least the sizes of dark and light areas, print contrast, overall size of the code, and dimensions of a guard (or blank) area around the barcode. Most of these standards are in place to make sure that, even with normal barcode degradation (copying, wear, etc.), the barcode will still be readable.

Some of the enhancements to barcodes described herein include code rewriting, contrast enhancement, erasing of the guard area, and edge alignment to pixel boundaries through code scaling and rotation, and compensation for ink bleed. Each of these enhancements might be appropriate in different situations.

In one embodiment, the image processing device may generate a guard area (e.g., a quiet area) of constant density around the new MRC to improve detection and readability. The guard area is designed so that it causes the new MRC to be read more easily (e.g., higher contrast). The guard area could be enforced by a scanner/copier by removing noise or dark pixels within a certain area around the MRC.

In addition, in one embodiment, the new MRC may be aligned against an orientation (e.g., horizontal or vertical orientation) of the rest of the content of the document. Furthermore, the image processing device may further adjust the contrast of the new MRC to further enhance the printing quality of the new MRC.

For example, barcodes are most easily read when they have clear transitions between light and dark areas. Those transitions are sharpest when they are printed on pixel boundaries. A barcode scanned on an image processing device, such as copier, may not be aligned correctly to maintain the transitions along the pixel boundaries. The barcode may be skewed by one or two degrees. In one embodiment, the region of the image containing the barcode is replaced with one that is not skewed but aligns with the pixels in the image and fits in substantially the same region as the original barcode. Thus, the barcode may be printed with higher contrast transitions and be more readable in more situations. In addition, if the contrast on the image scanned is low, the barcode may be less readable on the printout. According to one embodiment, barcode may be replaced with the highest possible contrast making the barcode reading easier in the future. Furthermore, OCR (optical character recognition) text may be rewritten instead of copying the original OCR text.

In one embodiment, the image processing device may be trained to recognize documents having predetermined formats and such training information may be stored in a memory. Subsequently, when a document is received for processing, the image processing device may recognize the format of the document based on the training information stored in the memory. Upon recognizing the format of the received document, the image processing device may automatically perform at least one of the above operations to improve the quality of the MRCs within the document.

According to yet another embodiment, if the scanned MRC has some information missing (e.g., a distorted barcode from a bent page), the system may decode the MRC to extract whatever information available and use the obtained information to reconstruct a substantially complete MRC using, for example, redundancy information or other information available from the original MRC. As a result, a damaged MRC can be repaired by the system.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

FIG. 1 is a block diagram of an exemplary embodiment of an image processing system. Referring to FIG. 1, exemplary system 100 includes an image processing system 102 to receive an original document 101 having an original machine readable code 104, such as a barcode, and to generate a new machine readable code (MRC) 105 at substantially the same location of the original MRC 104 when the new document 103 is stored or printed by image processing system 102. Image processing system 102 may include a machine readable code re-writer, such as the re-writer that is part of multi-function peripheral 400 shown in FIG. 4, to scan the original MRC 104 from the original document 101. Image processing system 102 may be a copier, a scanner, a fax machine, a camera, a printer server, or other image forming or capturing devices or systems.

In one embodiment, after image processing system 102 receives document 101 having MRC 104, such as a barcode, the image processing system 102 searches and locates MRC 104 on the received document 101. In one embodiment, document 101 may be an image scanned from a physical document received from a feeder of the system 102 by a user. Alternatively, document 101 may be received electronically (e.g., an email file, a PDF file, a JPEG file, a word document, etc.) via a communication interface (e.g., wired or wireless) of the system, particularly, for example, over a network such as the Internet. Locating MRC 104 may be performed by looking for a series of regular, alternating light and dark areas as is well known in the art. Software to locate MRCs in images is available from LEAD Technologies, Inc. of Charlotte, N.C., U.S.A.

Once the MRC is located, image processing system 102 scans and decodes the MRC 104 and optionally stores the scanned MRC in the memory for future references. Image processing system 102 then generates a new MRC 105 based on the original MRC 104, where the new MRC 105 represents the data of the original MRC 104. Image processing system 102 may store or print as a part of printing document 103 on a media, the new MRC 105 into document 103 at substantially the same location relative to the rest of the contents of the document.

Document 103 may be directly printed on a physical media, such as a piece of paper. In one embodiment, new MRC 105 has a higher printing quality (e.g., brightness and contrast) than the original MRC 104 with respect to the background of the document 103. Alternatively, document 103 may be stored as an electronic image or file capable of being transmitted to a third party over a network. Furthermore, document 103 may be transferred to a remote printer, such as a printer server over a network, where document 103 may be printed with the new MRC 105.

Figure 2A:
FIGS. 2A-2C are diagrams illustrating an exemplary process for processing machine readable codes.
Figure 2B:
Figure 2C:
Figure 3A:
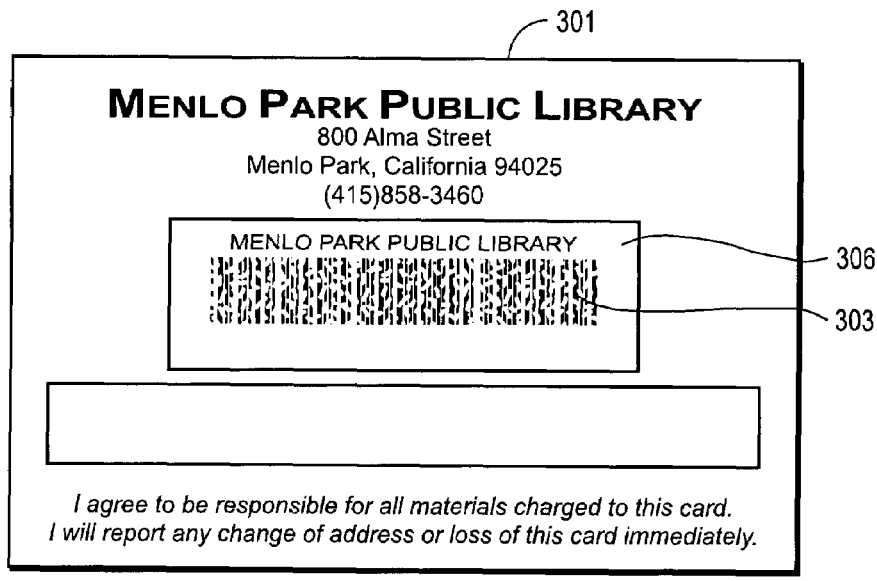
Figure 3B:
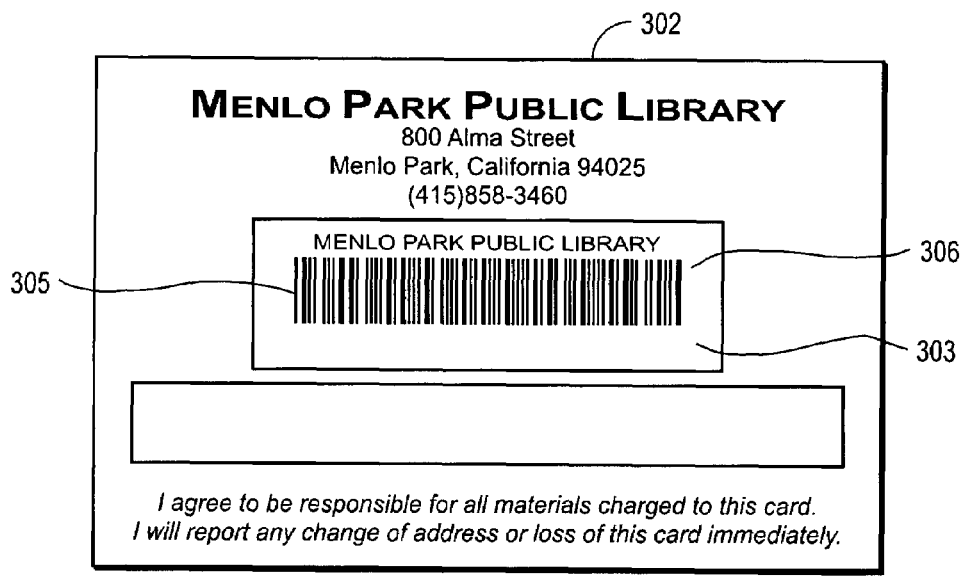

In one embodiment, image processing system 102 generates a guard area, such as guard area 206 of FIG. 2C or guard area 304 of FIG. 3B, around the new MRC 105. The guard area is a light or white rectangle that allows the new MRC to be read or recognized more clearly and easily.

Figure 7:
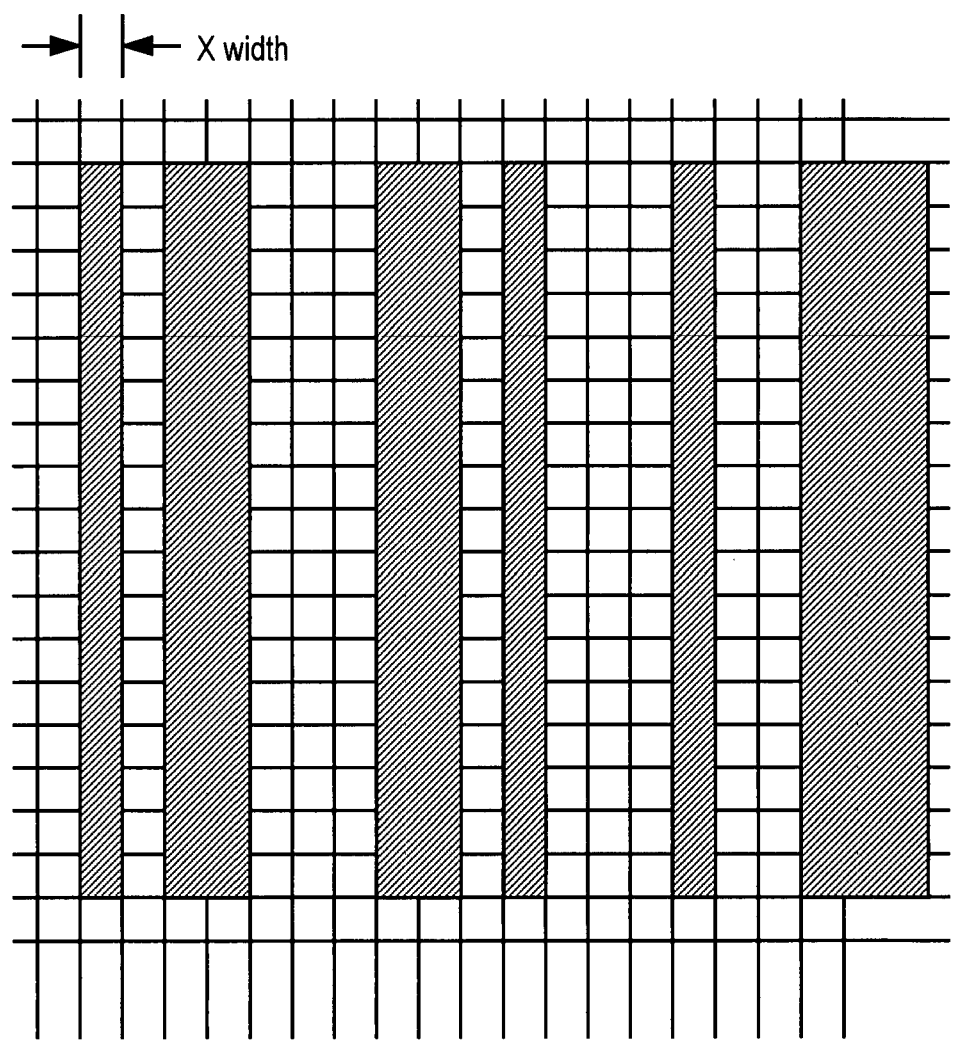
FIG. 7 illustrates each barcode line or space corresponding to one or an integral number of columns of pixels.

In addition, in one embodiment, the new MRC 105 is aligned in the captured document image so that dark-light transitions occur on pixel boundaries. In one embodiment, the x-width of MRC 105 may be adjusted. Furthermore, in an alternative embodiment, image processing system 102 adjusts the contrast of the new MRC 105 such that the printing quality of the new MRC 105 is further enhanced. The lines of the new MRC 105 may be printed so that each barcode line or space corresponds to only one or an integral number of columns of pixels to further enhance the printing quality of the new MRC 105. That is, x-width of the new MRC 105 may be printed on pixel boundaries and each line of the new MRC 105 corresponds to the size of a single pixel width or an integral multiple of pixel widths. This is shown in FIG. 7.

In an alternative to barcodes, the techniques described herein are applicable to OCR characters. OCR characters have certain standards that indicate their size, etc. for optimal readability. If OCR characters are found and decoded, they can be rewritten using a standard OCR font, such as OCR-A font (ANSI x3.17-1981) and OCR-B font (ANSI x3.49-1982).

In one embodiment, image processing system 102 may be trained to recognize documents having predetermined formats and such training information may be stored in a memory. Subsequently, when a document is received, image processing system 102 may recognize the format of the document based on the training information stored in the memory. Upon recognizing the format of the received document, image processing system 102 may automatically perform the reprinting of the MRCs described above to improve the quality of MRCs within the document.

For instance, a business or medical office might use a series of forms in daily business transactions and those forms might contain standard 2D barcodes (PDF417 for example) in the upper left corner of each form. In one embodiment, a copier or a multi-function peripheral (MFP) is trained to look for all pages which have PDF417 barcodes in the upper left corner and if so, rewrite those barcodes while ignoring all other forms, including those with 1D barcodes in the lower left corner.

Training may consist of supplying an example of each type of form to the copier and indicating to the copier that it should always rewrite pages that have this "signature." The signature may be established by looking at the page image, finding all of the barcodes, determining which type of code is being used, and noting the location of the barcode on the page.

In one embodiment, the signature includes the following for each page:
page dimensions (in inches or pixels)
list of barcodes found on page including
   type of code (PDF417, Code 128, DataMatrix, etc.)
   orientation
   location
The signature could be stored in a simple database on the multi-function peripheral (MFP) (combination scanner/printer/copier). In one embodiment, each time a page is scanned by the copier, the copier looks in the scanned image for barcodes and creates a signature for that page. The copier could then compare the page's signature to the signatures stored in the database. If the signatures are the same (within some tolerance due to movement of the pages through the scanner hardware), the barcodes are rewritten before the copy is printed.

The signature of a scanned page could be considered equal to the signature of a stored page if the number of barcodes in the scanned page is the same as the number in the stored page signature and, for each barcode, the center of the barcode was within some maximum number of pixels of the center of a barcode in the stored signature, the types of barcodes matched, and the orientation of the barcode in the scanned page was the same as in the stored page signature.

In one embodiment, image processing system 102 may further include a display and a user interface to allow a user to interact with image processing system 102. The user interface may simply be a physical button or switch on a panel of the system. Alternatively, the user interface may be a graphical button displayed by the display, which may be activated through a click of a mouse or a touch via a touch screen of the display. For example, according to one embodiment, image processing system 102 may examine the original MRC, such as MRC 104, to determine whether the condition of the original MRC has degraded. If so, image processing system 102 may prompt the user, via the display, to determine whether the user wants to reprint a new MRC, such as new MRC 105, replacing the original MRC. The user may respond through the user interface to interact with image processing system 102 on whether a new MRC is needed. If a new MRC is needed, the new MRC is generated and printed in place of the original MRC via one of the aforementioned techniques. Otherwise, the original MRC is copied and reprinted on the media.

Rewriting barcodes in documents changes the look of a document. For instance, if the user presents a low contrast text document containing some barcodes to a multi-function peripheral (combination scanner/printer/copier) and the barcodes are rewritten, the barcodes may stand out on the page when they are printed with high contrast and sharper edges. If the barcodes are unimportant on that page, the user may want to just have a normal copy without barcode rewriting.

It would be possible to provide two different buttons on a copier, an MFP, or other device described herein—one that copies with barcode rewriting, and another that does a normal copy. Alternatively, in the embodiment described above, a pattern is recognized in the barcode style and location on the page—a page signature—and the decision of whether or not to rewrite the barcodes is based on the whether or not the signature is recognized.

Image processing system 102 may be a peripheral device having a server capable of directly connecting to a network, such as the Internet. The display and the user interface described above may be presented on a Web page accessible over the Internet. A user, upon optionally logging into his/her account over a network, may instruct through a variety of protocols, such as, for example, HTTP (hypertext transport protocol), XML (extended markup language), or other suitable communication protocols, system 102 to process a MRC using one of the aforementioned techniques.

FIGS. 2A-2C are diagrams that illustrate an exemplary embodiment of a process for processing MRCs. According to one embodiment, document 201 having a MRC 202, which may be a barcode, is received by image processing system 102. A user may receive document 201 from a feeder of system 102, or alternatively, document 201 may be received from at a communication interface over a network or via a photographic process. As shown in FIG. 2A, quality of MRC 202 of document 201 has been degraded over a period of time. Accordingly, image processing system 102 may process MRC 202 using at least one of the aforementioned techniques that generates a new MRC 204, which is printed on an output document or image 203. The new MRC 204 may have a better quality, such as brightness and contrast, than the original MRC 202.

In addition, as shown in FIG. 2C, a new MRC 204 is placed at the location of the original MRC 202 with a guard area 206 around it. As a result, guard area 206, which is white in one embodiment, causes the new MRC 204 to be read and recognized more clearly. Furthermore, the X-width of the new MRC 204 may be adjusted to allow each barcode line or space to correspond to one or an integral number of columns of pixels. This further enhances the printing quality of the new MRC 204.

Most barcodes contain error correction information so that if the barcode is slightly corrupted and some elements or data are unreadable, the original data can be calculated from the remaining readable elements. According to yet another embodiment, if the original MRC 202 has some information missing (e.g., a distorted barcode from a bent page), the system may decode the original MRC 202 to extract whatever information available and use the obtained information to reconstruct a complete MRC 204 using, for example, redundancy information available from the original MRC. That is, in this case, if corrupted data is detected and repairable, the newly printed barcodes will contain the original data instead of the corrupted data. As a result, an original degraded MRC can be repaired by the system.

FIGS. 3A and 3B are diagram illustrating another embodiment of a process for processing MRCs. Similar to the process illustrated by FIGS. 2A-2C, an original document 301 having a MRC 303 is received and processed by image processing system 102. When an output document 302 is printed, a new MRC 305 is generated, with guard area 304 around it, based on the original MRC 303, which is placed at substantially the same location of the original MRC 303. The background of guard area 306 may be designed to cause new MRC 305 to be read and recognized more easily in comparison to the original background 306. Guard area 306 may be enforced by the system by removing noise and dark pixels within a certain area around the new MRC 305.

Furthermore, the new MRC 305 may be adjusted and printed in accordance with boundaries of pixels when document 302 is printed. FIG. 3C is an enlarged version the exemplary new MRC 305. Referring to FIG. 3C, exemplary MRC 305 includes one or more elements, such as lines 307, 308, and 309. In one embodiment, the x-width (e.g., a horizontal orientation) of MRC 305 may be adjusted to allow each barcode line or space to correspond to one or an integral number of columns of pixels. That is, each transition between black and white of MRC 305 (e.g., lines 307-309) may be printed on the pixel boundaries and each line of MRC 305 has a width corresponding to one or a multiple of a pixel width.

For example, referring to FIG. 3C, when MRC 305 is printed, lines 307-309 may be printed in alignment with the pixels of the media being printed. The white areas between lines 307-309 are also called "spaces." On a fax machine, inkjet, or laser printer, individual dots are usually printed at some resolution based on the hardware, sometimes 200, 600, or 1200 dots per inch. The dots are laid out in a rectangular grid aligned with the direction of media movement through the printer. If the barcode is aligned with the grid and the barcode is scaled so that the transitions between the lines and white areas correspond precisely to the pixel or dot boundaries, a high-contrast print will be created. Transitions between lines and spaces are easier to detect when lines and spaces correspond directly to individual pixels. When line/space transitions occur in the middle of a pixel, a gray pixel is printed and the transition is more difficult to detect and measure. According to a further embodiment, the system may be able to adjust the scale or side of the barcode so that the transitions between bars and spaces of an MRC occur on pixel boundaries.

A Multi-Function Peripheral

Figure 4:
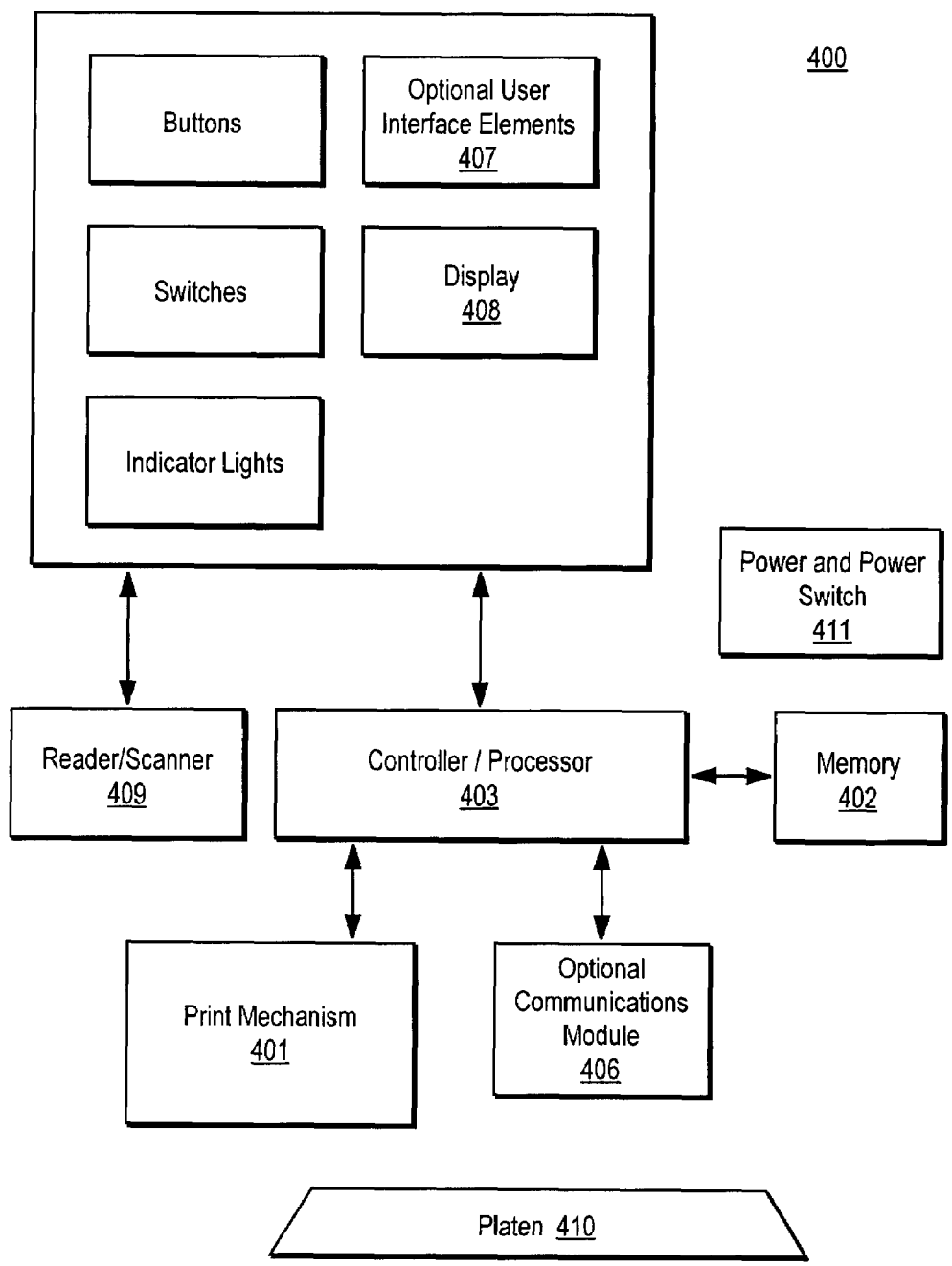
FIG. 4 is a block diagram of an exemplary embodiment of a multi-function peripheral (MFP).

FIG. 4 is a block diagram of an exemplary embodiment of an MFP, that reads machine readable codes (MRCs), such as barcodes, stores MRCs, and/or prints MRCs on some form of print media. Such a device may be part of a copier or multifunction machine. The device may be sized for handheld use or larger use (portable or not).

Referring to FIG. 4, MFP 400 includes a scanner/barcode reader 409. In one embodiment, scanner/barcode reader 409 operates based on a CCD (which takes an image of a barcode) or a scanning light, like a laser, that scans over the barcode and whose reflections are read by a sensor. In one embodiment, the barcode reader/scanner comprises a CCD optical module from HHP of Skaneateles Falls, N.Y. These are non-contact scanners, like those found in retail sales establishments. Alternatively, the barcode reader portion of printer/scanner 401 maybe a contact scanner like a barcode pen. In one embodiment, MFP 400 includes a "scan" switch that causes the barcode scanner 409 to read a barcode when activated.

In one embodiment, a memory 402 is coupled to scanner 409 to store barcodes that have been scanned in. A controller 403 is coupled to scanner 409 and memory 402 to control operation of the device. Controller 403 may comprise one or more processors such as, for example, but not limited to, a StrongArm or an x86 processor from Intel Corporation of Santa Clara, Calif., a DragonBall processor from Motorola of Schaumburg, Ill., etc.

MFP 400 may also include printing mechanism 401 that prints documents including barcodes. In one embodiment, the printer head comprises Ink Jet Technology 641 D2 from Ink Jet Technology, Inc. of San Jose, Calif. According to a further embodiment. MFP 400 includes a platen 410 on which a document can be placed for scanning. MFP 400 may further include a power supplier 411 having a power switch or the like to provide power to MFP 400.

In one embodiment, MFP 400 operates as follows. When MFP 400 scans in a page, it checks for a readable barcode. If one is detected, the barcode is decoded and a new barcode is created and replaces the original barcode as described above.

MFP 400 may optionally include communications module 406 coupled and controlled by controller 403 to communicate with an external device. Communications module 406 may comprise network, telephone, wired, wireless or other well-known communication applications. Such an external device may be a computer system and/or database. Such a connection may be useful to obtain information (e.g., related to a scanned barcode) or to convey information.

MFP 400 may optionally include a display 408 (e.g., an LCD display such as used in cell phones and Personal Digital Assistants (PDAs)) to display scanned barcodes and/or other information. The other information may include information obtained from memory 402 or an external location via optional communications module 406. User interface 407 may include buttons, switches, indicator lights, and other optional user interface clients.

It will be appreciated that MFP 400 may be implemented as a part of image processing system 102. For example, a barcode re-writer may be embedded within a copier, a scanner, a printer, a fax machine, a camera, or other image forming or capturing devices. Alternatively, MFP 400 may be a standalone device that is communicably coupled, wired or wirelessly, to one of the aforementioned devices or servers. Other configurations apparent to those with ordinary skills in the art may be implemented.

One popular method for exchanging information is with electronic faxing. With electronic faxing, a fax received at a fax machine might be electronically forwarded to the recipient via email and not be printed immediately. In one embodiment, a fax machine may include hardware and/or software to perform the techniques described herein. If such a fax machine were used before a received document was printed, the image of each page would be checked for existing barcodes. If a barcode was found, it would be decoded. The data from the barcode could then be recoded at a size that would fit within the rectangle that contained the original barcode. If the fax machine supported several levels of gray or color, the new barcode is created with the highest available contrast. Each barcode is added to the received page image in a way that replaces the original barcode while being aligned with the pixels of the scanned page so that when it printed out, the transitions along the bars of the barcode would align with the print head. In one embodiment, the new barcode information is written aligned with the pixels of the scanned image, even though it may not be printed out. This assures that if it were to be printed, the printout would be as high quality as possible. If the printing process bleeds after printing, the barcode bars could be printed slightly undersized to take account of the bleeding of the ink so that the final printed product would be accurate.

In many cases, the barcode might not be printed immediately; it might just be inserted in the image, like in a picture taken with a camera. For example, in another embodiment, a digital camera may be used to take a picture of an object with a barcode on it. The teachings described herein may be used to re-write a portion of the image taken by the digital camera to include a more readable version of the barcode.

An Exemplary Data Processing System

Figure 5:
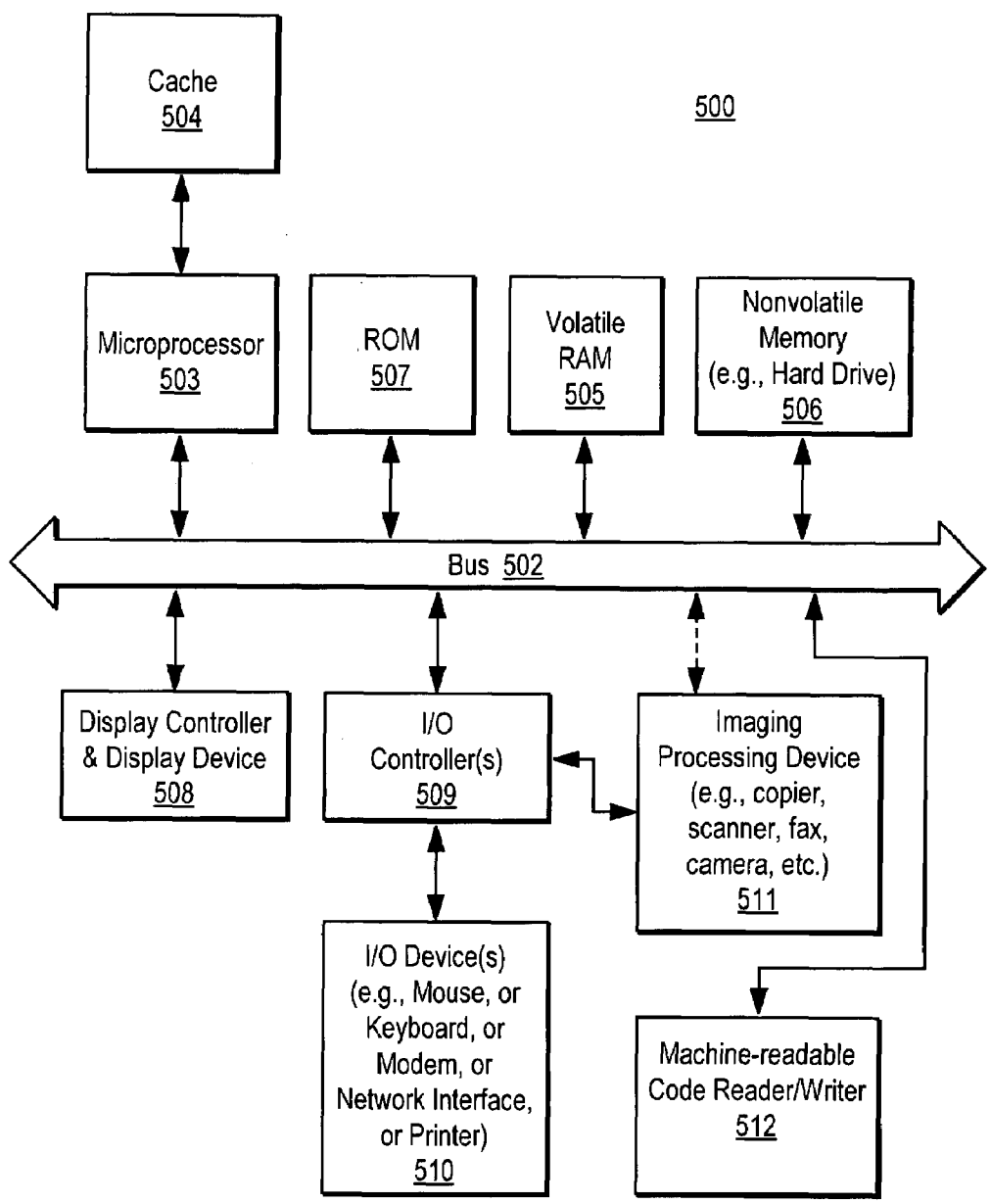
FIG. 5 is a block diagram of an exemplary embodiment of a data processing system.

FIG. 5 is a block diagram of an exemplary data processing system, which may be used with an embodiment. For example, system 500 shown in FIG. 5 may be implemented as image processing system 102 of FIG. 1. Note that while FIG. 5 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention.

As shown in FIG. 5, the computer system 500, which is a form of a data processing system, includes a bus 502 which is coupled to a microprocessor 503 and a ROM (read-only memory) 507, a volatile RAM (random access memory) 505, and a non-volatile memory 506. The microprocessor 503, which may be a Pentium™ processor from Intel Corporation, is coupled to cache memory 504 as shown in the example of FIG. 5. The bus 502 interconnects these various components together and also interconnects these components 503, 507, 505, and 506 to a display controller and display device 508, as well as to input/output (I/O) devices 510, which may be mice, keyboards, modems, network interfaces, printers, and other devices which are well-known in the art. Typically, the input/output devices 510 are coupled to the system through input/output controllers 509. In one embodiment, I/O devices 510 includes a printer to print documents. The volatile RAM 505 is typically implemented as dynamic RAM (DRAM), which requires power continuously in order to refresh or maintain the data in the memory. The non-volatile memory 506 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 5 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 502 may include one or more buses connected to each other through various bridges, controllers, and/or adapters, as is well-known in the art. In one embodiment, the I/O controller 509 includes a USB (Universal Serial Bus) adapter for controlling USB peripherals.

In addition, according to one embodiment, system 500 may include an image processing device 511 coupled to IO controller 509 or to bus 502 that is operable to read documents into the computer system for processing, as well as perform processing. Computer system 500 may further include a machine readable code (MRC) re-writer 512, such as MFP 400 of FIG. 4, that performs the re-writing of the original barcode with a new barcode on electronic versions of documents. Image processing device 511 and MRC re-writer 512 may be implemented as a peripheral device to perform at least one of the aforementioned processes for processing MRCs.

An Exemplary Flow Diagram

Figure 6:
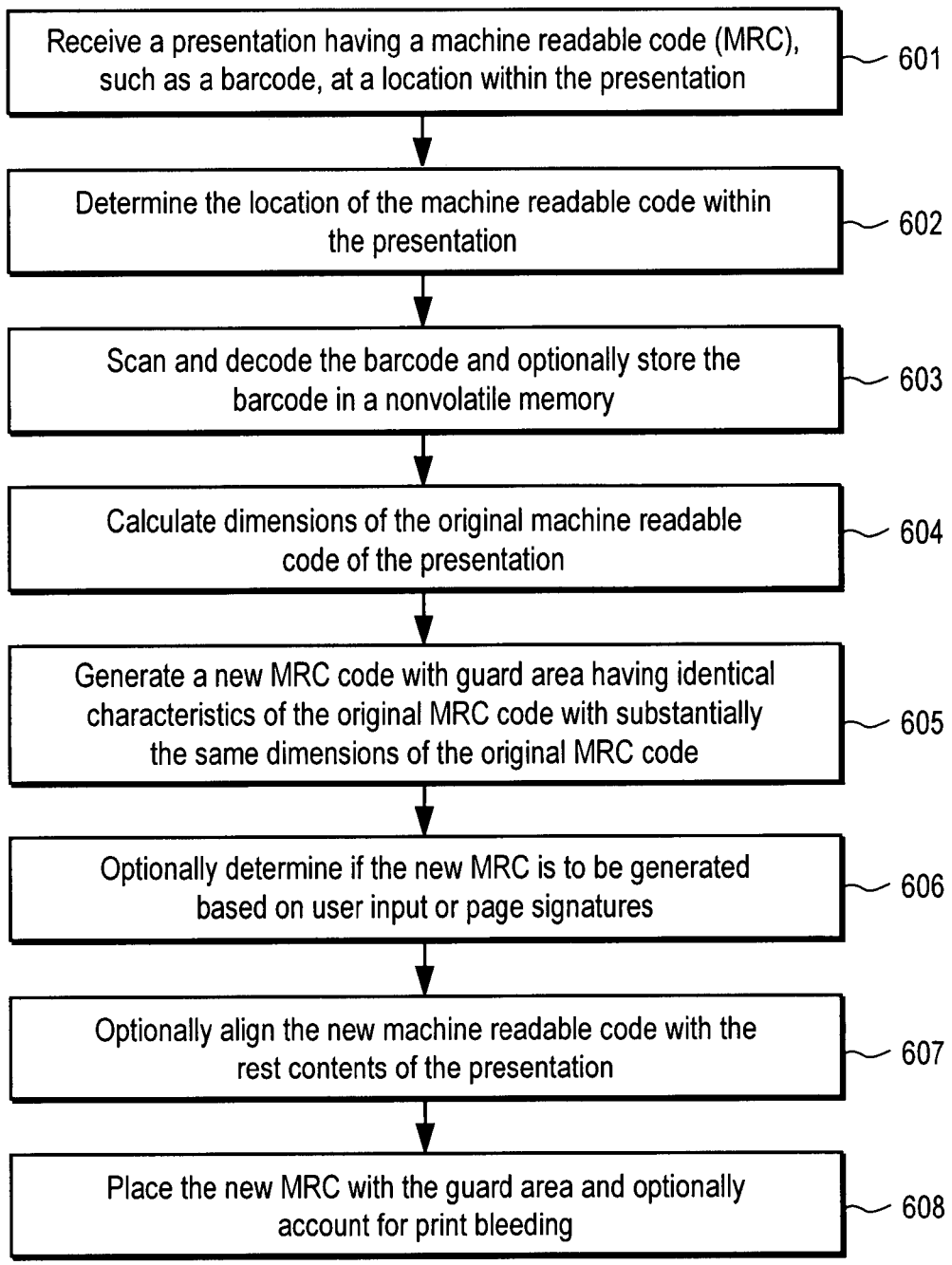
FIG. 6 is a flow diagram of an exemplary embodiment of a process for processing machine readable codes.

FIG. 6 is a flow diagram illustrating an exemplary embodiment of a process for processing machine readable codes (MRCs). The exemplary process 600 may be performed by processing logic which may comprise hardware (circuitry, dedicated logic, etc.), software (such as is run on a general purpose computer system or a dedicated machine), or a combination of both. In one embodiment, exemplary process 600 includes capturing an original machine-readable code (MRC) at a location of a document, generating a new MRC based on the original MRC, the new MRC encoding the same data of the original MRC, and storing and/or printing the new MRC on a media as a part of printing the document on the media. The new MRC is located in the document at substantially the same location as the original MRC with respect to rest of contents of the document.

Referring to FIG. 6, at processing block 601, a document or presentation having a machine readable code (MRC), such as a barcode, is received. In one embodiment, the received document is an image scanned based on a physical document inserted via an input (e.g., a feeder) of an image processing system, such as a copier or a scanner, etc. Alternatively, the document may be received electronically, such as an email file, a PDF file, a JPEG file, or a word processing document file, over a network or captured as a photo. At processing block 602, a location of the MRC is determined within the received document. At processing block 603, the MRC is scanned and decoded and optionally stored in the memory.

At processing block 604, the dimensions of the original MRC are calculated and at processing block 605, a new MRC is generated based on the original MRC. The new MRC may have identical characteristics of the original MRC and have substantially the same dimensions of the original MRC.

In one embodiment, processing logic determines if the new MRC is to be generated based on user input or page signatures (processing block 606).

At processing block 607, the new MRC may be optionally aligned with an orientation, in horizontal or vertical, and is aligned with the pixel grid (which is most likely not aligned with the contents). At processing block 608, the new MRC is placed at the location that the original MRC occupies with a new guard area. The guard area may be designed to have a background that improves the contrast and/or brightness between the guard area and the new MRC when the new MRC is surrounded by or on the top of the guard area. The new MRC may optionally account for print bleeding. Other operations apparent to those with ordinary skills in the art may be included.

Thus, a method and apparatus for processing MRCs have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:
capturing an original machine-readable code (MRC) at a location of a document;
generating a new MRC based on the captured original MRC, the new MRC representing the same data of the original MRC, the new MRC and the original MRC having an identical format; and
replacing the original MRC with the new MRC to generate an electronic version of the document having the new MRC and a remainder of contents of the document, wherein the new MRC is located at substantially the same location as the original MRC with respect to the remainder of the contents of the document.

2. The method of claim 1 further comprising printing the document on a media with the new MRC.

3. The method of claim 1, further comprising:
scanning the document; and
locating the original MRC within the scanned document.

4. The method of claim 1, further comprising:
recognizing the original MRC of the document; and
determining the location of the MRC with respect to contents of the document.

5. The method of claim 1, further comprising determining dimensions of the location where the original MRC occupies, wherein the new MRC is generated having substantially the same dimension of the original MRC's dimension.

6. The method of claim 1, further comprising aligning the new MRC with the direction of the pixels comprising the image prior to the printing.

7. The method of claim 1, further comprising aligning the new MRC with respect to pixel boundaries in the document.

8. The method of claim 1, further comprising assuring that the location of the original MRC is clear or a solid color.

9. The method of claim 1, further comprising:
   determining whether the original MRC has a sufficient quality; and
   prompting for an input whether the original MRC needs to be replaced if it is determined that the original MRC lacks sufficient quality, wherein the new MRC is generated and printed in response to the input received.

10. The method defined in claim 9 wherein sufficient quality is based on at least one of contrast and orientation and detected read errors and image noise.

11. The method of claim 1, further comprising recognizing a signature of the document, wherein generating and printing the new MRC are performed automatically if the format of the document is recognized.

12. The method of claim 1, wherein the original MRC is a barcode.

13. The method of claim 1, wherein the original MRC is an OCR text.

14. A machine-readable medium having executable code to cause a machine to perform a method, the method comprising:
   capturing an original machine-readable code (MRC) at a location of a document;
   generating a new MRC based on the original MRC, the new MRC representing the same data of the original MRC, the new MRC and the original MRC having an identical format; and
   replacing the original MRC with the new MRC to generate an electronic version of the document having the new MRC and a remainder of contents of the document, wherein the new MRC is located at substantially the same location as the original MRC with respect to the remainder of the contents of the document.

15. The machine-readable medium of claim 14, wherein the method further comprises printing the document on a media with the new MRC.

16. The machine-readable medium of claim 14, wherein the method further comprises:
   scanning the document; and
   locating the original MRC within the scanned document.

17. The machine-readable medium of claim 14, wherein the method further comprises:
   recognizing the original MRC of the document; and
   determining the location of the MRC with respect to contents of the document.

18. The machine-readable medium of claim 14, wherein the method further comprises determining dimensions of the location where the original MRC occupies, wherein the new MRC is generated having substantially the same dimension of the original MRC's dimension.

19. The machine-readable medium of claim 14, wherein the method further comprises aligning the new MRC with the direction of the pixels comprising the image prior to the printing.

20. The machine-readable medium of claim 14, wherein the method further comprises aligning the new MRC with respect to pixel boundaries in the document.

21. The machine-readable medium of claim 14, wherein the method further comprises assuring that the location of the original MRC is clear or a solid color.

22. The machine-readable medium of claim 14, wherein the method further comprises:
   determining whether the original MRC has a sufficient quality; and
   prompting for an input whether the original MRC needs to be replaced if it is determined that the original MRC lacks sufficient quality, wherein the new MRC is generated and printed in response to the input received.

23. The machine-readable medium of claim 22, wherein sufficient quality is based on at least one of contrast and orientation and detected read errors and image noise.

24. The machine-readable medium of claim 14, wherein the method further comprises recognizing a signature of the document, wherein generating and printing the new MRC are performed automatically if the format of the document is recognized.

25. The machine-readable medium of claim 14, wherein the original MRC is a barcode.

26. The machine-readable medium of claim 14, wherein the original MRC is an OCR text.

27. A method, comprising:
   locating and capturing a first machine readable code (MRC) at a location of a first image representing an electronic document page scanned from a physical document;
   recognizing a page signature of the first image;
   automatically generating a second MRC based on the first MRC in response to the recognized page signature; and
   replacing the original MRC with the new MRC to generate a second image, the original MRC and the new MRC having an identical format and representing the same data, wherein the new MRC is located at substantially the same location as the original MRC with respect to a remainder of content of the first image.

28. A method, comprising:
   locating and capturing a first machine readable code (MRC) at a location of a first image representing an electronic document page scanned from a physical document;
   generating a second MRC based on the first MRC to generate a second image, the original MRC and the new MRC having an identical format and representing the same data; and
   placing the second MRC with a guard area at substantially the same location as the first MRC with respect to rest of pixels of the first image, wherein the guard area causes the second MRC to be read more easily than the first MRC when the second image having the second MRC is printed.

* * * * *